CONFIGURATION FOR TIME DIVISION SWITCHING MATRIX

Filed Feb. 16, 1967 3 Sheets-Sheet 1

INVENTORS
EUGENE N. SCHROEDER
STEPHEN J. MEYERS
BY Harry A. Herbert Jr. and Herbert E. Flomer
ATTORNEYS INVENTORS
EUGENE N. SCHROEDER
STEPHEN J. MEYERS
BY Harry A. Herbert Jr. and Herbert E. Idomer
ATTORNEYS

CONFIGURATION FOR TIME DIVISION SWITCHING MATRIX

Filed Feb. 16, 1967 3 Sheets-Sheet 3

(M ≠ X)
AND/OR (ALL INPUTS ISOLATED)

(USE OF AMPLIFIER FOR CONNECTION TO LINE)

(USE OF TIME GATE)

INVENTORS
EUGENE N. SCHROEDER
STEPHEN J. MEYERS
BY Harry A. Herbert Jr
Herbert E. Johnson and
ATTORNEYS United States Patent Office 3,490,001
Patented Jan. 13, 1970

3,490,001
CONFIGURATION FOR TIME DIVISION SWITCHING MATRIX

Eugene N. Schroeder, Bethesda, and Stephen J. Meyers, Rockville, Md., assignors to the United States of America as represented by the Secretary of the Air Force Filed Feb. 16, 1967, Ser. No. 617,772
Int. Cl. H04q *11/04*
U.S. Cl. 340—147 4 Claims

ABSTRACT OF THE DISCLOSURE

An apparatus for connecting any of a plurality of input lines to any of a plurality of output lines. An OR selective sequence is utilized to accomplish the selected connection.

Figure 1:
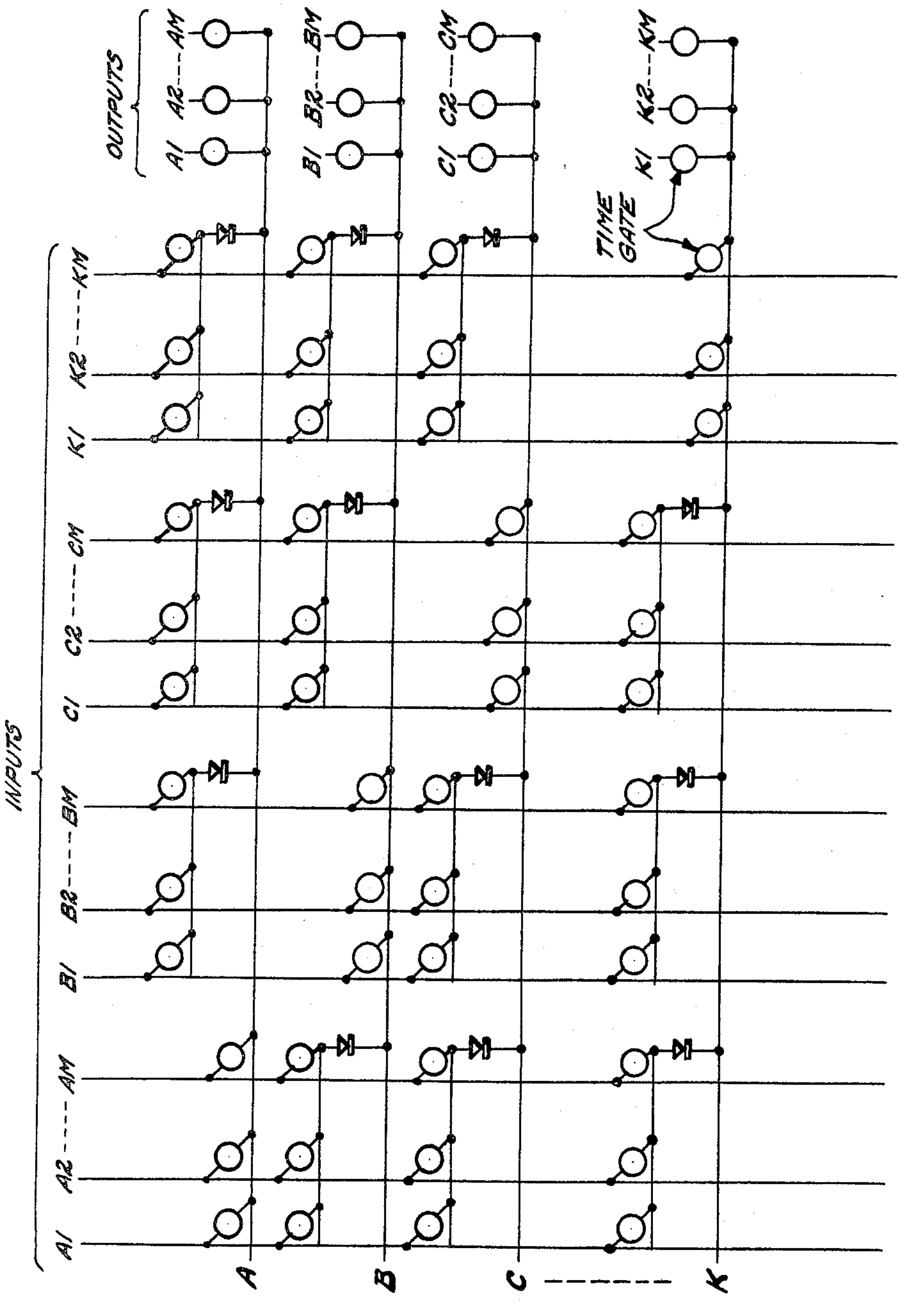

This invention relates to data transfer, and more specifically, to an improvement in the highway capacity of the time division switching matrix disclosed in a copending application filed by Eugene N. Schroeder on Sept. 24, 1964 and bearing Ser. No. 398,811 now U.S. Patent 3,402,-392 issued Sept. 17, 1968.

Briefly, in accordance with the present invention, an improved highway configuration is provided by reducing the highway capacitance by grouping input lines, connecting their respective gates in an AND-OR arrangement, and connecting a common OR output of the group to an output highway through an isolation diode or amplifying circuit. Any input of the group may be connected to the highway through the isolation diode by energizing the base of the proper time gate.

A more complete understanding of the invention, together with additional advantages, features and objects thereof, will be apparent from the following detailed description and claims and the accompanying drawings, which disclose, by way of example, the principle of the invention and the best mode which has been contemplated of applying that principle.

Figures 2A, 2B:
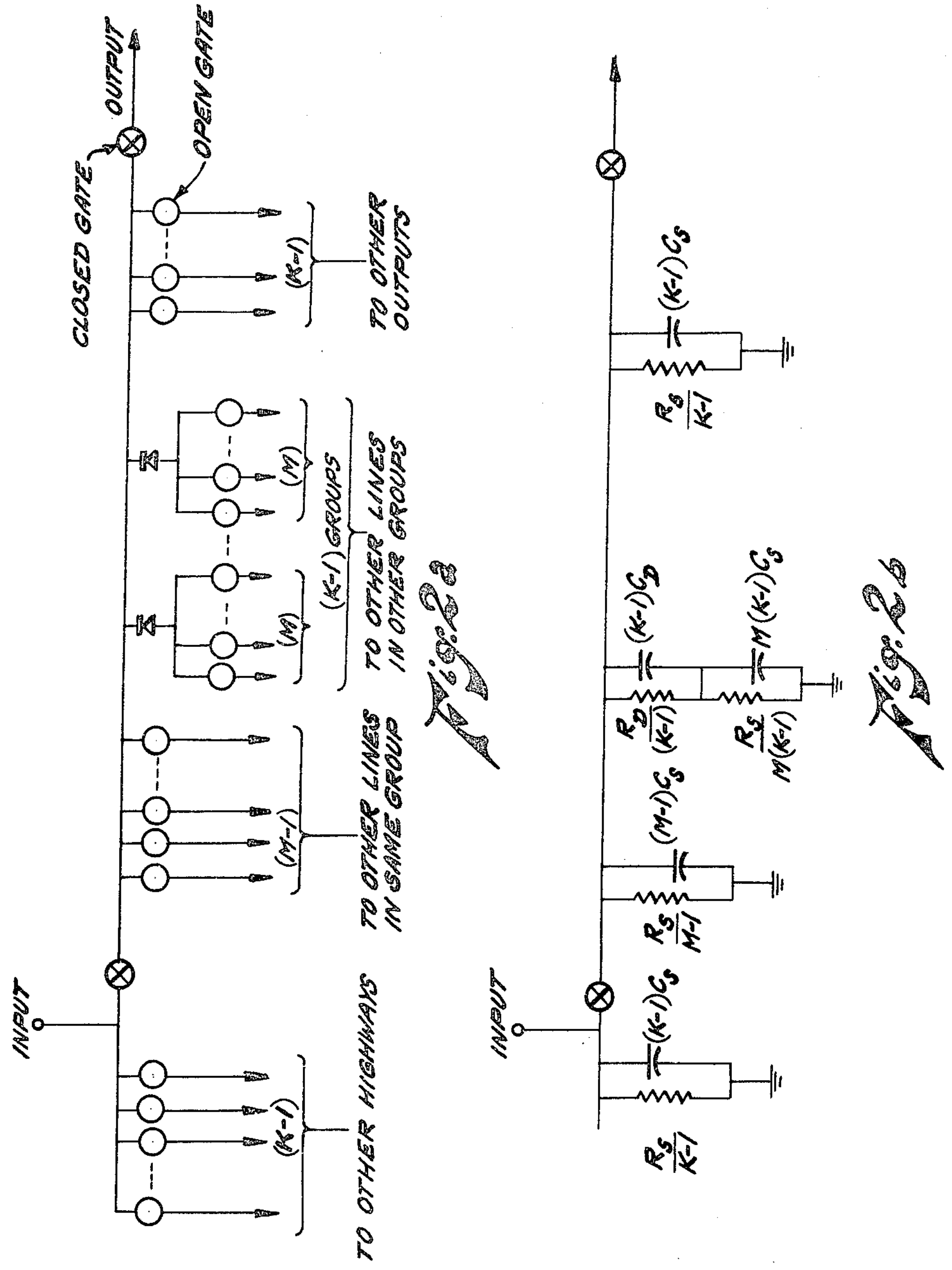
Figure 3A:
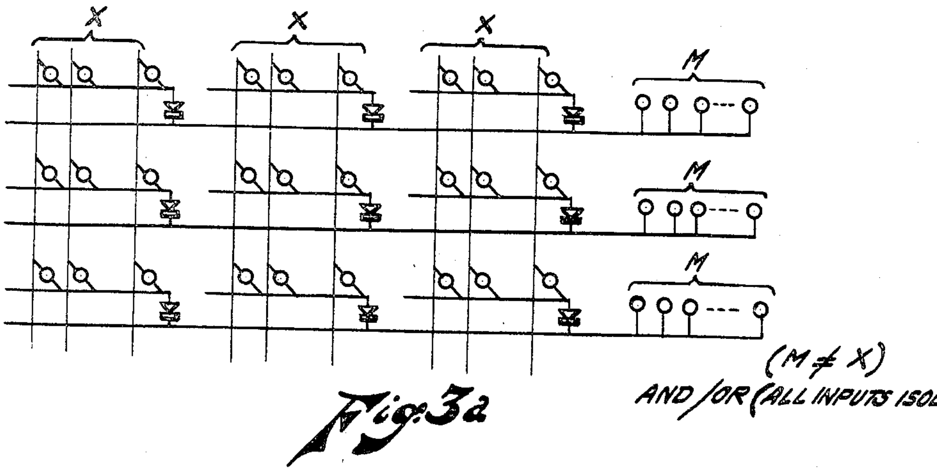

In the drawings:

FIG. 1 is an overall diagram showing the input circuits, the output circuits, the time gates and the isolation diodes to be described;

FIGS. 2*a* and 2*b* are simplified equivalent circuits of FIG. 1 for a 1000 line system and a 2000 line system respectively; and FIG. 3*a*, *b* and *c* are three modifications of the isolation circuitry shown in FIG. 1.

In the time division switching system described in the above-cited copending application, the highway capacity is:

$$C_{H1}=(K-1)C_S+(N-1)C_s+(M-1)C_S$$

Now consider the improved configuration of the disclosure (FIG. 1) and its simplified equivalent circuit (FIG. 2). The number of crosspoints is unchanged. With the closed gate as indicated, the highway capacity is $$C_{H2}=(K-1)C_S+(M-1)C_S+\frac{(K-1)C_D M(K-1)C_S}{(K-1)C_D+M(K-1)C_S}+(K-1)C_S$$

If $C_D$ is assumed equal to $C_S$, the highway capacity becomes $$2(K-1)C_S+(M-1)C_S+\frac{M(K-1)}{(M+1)}C_S$$

Now, large highway capacity causes signal degradation which may hamper transmission of information. Let us compare $C_{H1}$ and $C_{H2}$, noting that K=number of highways, M=number of outputs per highway, and N=total number of lines. Note also that $N=KM$.

$$\text{For } M>20,\ \frac{M}{M+1}=1$$

is a reasonable approximation.
Therefore, $$C_{H1}=(K-1)C_S+(M-1)C_S+(KM=1)C_S$$

$$C_{H2}=3(K-1)C_S+(M-1)C_s$$

For $$C_{H2}<C_{H1},\ 2(K-1)<(KM-1)$$

$$2K-2<KM-1$$

$$2K<KM+1$$

But this is true for $M>2$. Furthermore, typical values of M are from 25 to 100. Therefore, the highway capacity is substantially reduced when the configuration of this disclosure is used.

For example, for a 1000 line system, namely, for $K=10$ and $M=100$, $C_{H1}=1107\ C_s$ and $C_{H2}=126\ C_S$. For a 10,000 line system, namely, for $K=M=100$, $$C_{H1}=10197\ C_S \text{ and } C_{H2}=396\ C_S$$

A similar development for the shunt resistance, where improvement is designated by a *higher* value, yields the requirement that $$R_S\frac{M+1}{(2M+1)(K-1)}>\frac{R_S}{KM-1}$$

This is true for $M>2$, if $K>2$. For a switching system of other than trivial size, these conditions will be met.

Figure 3B:
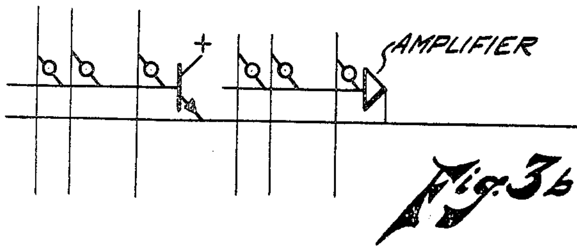
Figure 3C:
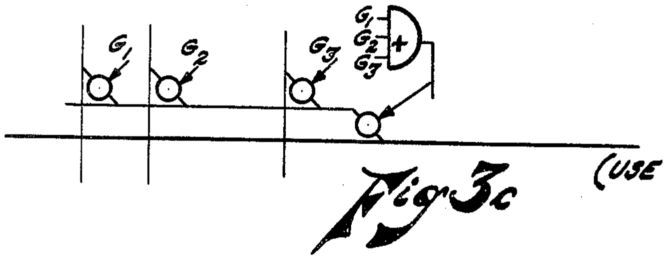

The bypass diodes used on the intergroup highways of FIG. 1 do not constitute the only array of circuitry to provide isolation. FIG. 3 shows several possible modifications, each capable of development and use by personnel competent in the art. FIG. 3*a* indicates that the number of inputs on a highway need not equal the number of outputs and that, if desired, every input may feed a bypass diode. FIG. 3*b* indicates that transistor amplifier may be used in place of a diode in the connection to a highway. FIG. 3*c* shows the additional alternative of a time gate for this connection.

It is to be noted in FIG. 2*b*, $R_S$ is the open switch resistance, $C_S$ is the open switch capacitance, $R_D$ is the diode reverse resistance and $C_D$ is the diode capacitance.

We claim:

1. In a switching matrix in which any of a plurality of input lines can be connected to any of a plurality of output highways through a gate circuit upon energization of the gate, the improvement comprising means for connecting the outputs of the gates of a group of said plurality of input lines in an OR relationship, and isolation means for connecting the OR output to the output highway.

2. The improved line switching circuit as described in claim 1 wherein said isolation means for connecting the OR output to the output highway comprises a bypass diode.

3. The improved line switching circuit as described in claim 1 wherein said isolation means for connecting the OR output to the output highway comprises a transistor amplifier.

4. The improved line switching circuit as described in claim 1 wherein said isolation means for connecting the OR output to the output highway comprises a time gate.

References Cited

UNITED STATES PATENTS

| | | | |
|---|---|---|---|
| 3,312,941 | 4/1967 | Booth | 340—166 |
| 3,225,331 | 12/1965 | Steeneck | 340—166 |
| 3,229,253 | 1/1966 | Logue | 340—166 |

HAROLD I. PITTS, Primary Examiner

U.S. Cl. X.R.

178—33; 179—16; 340—166, 176